(12) United States Patent
Brambrink et al.

(10) Patent No.: US 11,207,871 B2
(45) Date of Patent: Dec. 28, 2021

(54) BEZEL FOR MOTOR VEHICLE GLAZING SYSTEMS

(71) Applicant: Covestro Deutschland AG, Leverkusen (DE)

(72) Inventors: Roland Brambrink, Leichlingen (DE); Florian Dorin, Cologne (DE); Alexander Meyer, Düsseldorf (DE); Peter Capellen, Krefeld (DE); Manfred Nawroth, Wipperfürth (DE)

(73) Assignee: Covestro AG, Leverkusen (DE)

( * ) Notice: Subject to any disclaimer, the term of this patent is extended or adjusted under 35 U.S.C. 154(b) by 40 days.

(21) Appl. No.: 16/535,332

(22) Filed: Aug. 8, 2019

(65) Prior Publication Data
US 2019/0358941 A1 Nov. 28, 2019

Related U.S. Application Data

(63) Continuation of application No. 15/509,555, filed as application No. PCT/EP2015/069718 on Aug. 28, 2015, now abandoned.

(30) Foreign Application Priority Data

Sep. 11, 2014 (EP) .................................... 14184464

(51) Int. Cl.
*B32B 3/10* (2006.01)
*B32B 27/08* (2006.01)
(Continued)

(52) U.S. Cl.
CPC ................ *B32B 27/08* (2013.01); *B32B 3/30* (2013.01); *B32B 27/302* (2013.01);
(Continued)

(58) Field of Classification Search
None
See application file for complete search history.

(56) References Cited

U.S. PATENT DOCUMENTS 3,451,169 A * 6/1969 Bell .................. F16B 5/121
49/462
3,644,574 A 2/1972 Jackson, Jr. et al.
(Continued)

FOREIGN PATENT DOCUMENTS

CA 1143607 A 3/1983
DE 1031512 B 6/1958
(Continued)

OTHER PUBLICATIONS

International Search Report for PCT/EP2015/069718 dated Oct. 9, 2015.
(Continued)

*Primary Examiner* — Christopher M Polley
(74) *Attorney, Agent, or Firm* — Faegre Drinker Biddle & Reath LLP

(57) ABSTRACT

The invention relates to trims for motor vehicle glazing systems, comprising a base layer and a coating and having glass-like optical properties at least in some subsections, composites consisting of such trims for motor vehicle glazing systems, and car body parts, as well as preferred embodiments which comprise suitable combinations of materials. Said trims comprising, at least towards the front side thereof, an edge rounding having a variable radius which allows a more uniform layer thickness for the coating.

15 Claims, 8 Drawing Sheets

Figure 1:
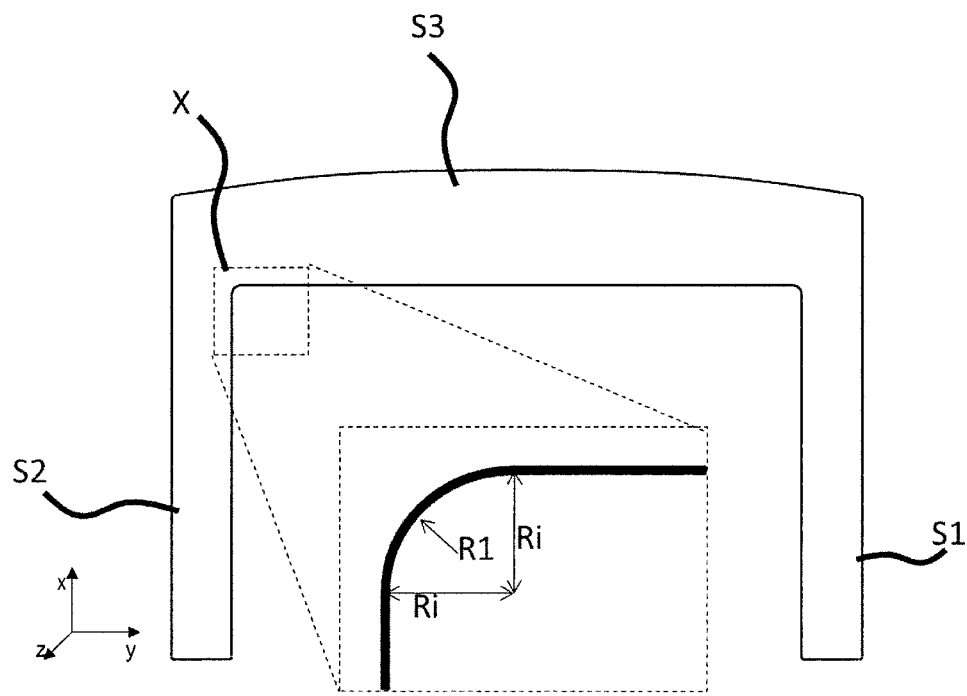

(51) Int. Cl.
*B32B 27/30* (2006.01)
*B32B 27/32* (2006.01)
*B32B 27/34* (2006.01)
*B32B 27/36* (2006.01)
*B32B 3/30* (2006.01)
*B32B 27/28* (2006.01)
*B32B 1/00* (2006.01)
*B32B 27/18* (2006.01)

(52) U.S. Cl.
CPC ............ *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B32B 1/00* (2013.01); *B32B 27/18* (2013.01); *B32B 27/28* (2013.01); *B32B 27/283* (2013.01); *B32B 2250/24* (2013.01); *B32B 2255/10* (2013.01); *B32B 2255/26* (2013.01); *B32B 2270/00* (2013.01); *B32B 2307/40* (2013.01); *B32B 2307/584* (2013.01); *B32B 2307/712* (2013.01); *B32B 2605/00* (2013.01); *B32B 2605/006* (2013.01); *B32B 2605/08* (2013.01)

(56) References Cited

U.S. PATENT DOCUMENTS

| | | | |
|---|---|---|---|
| 3,867,774 A * | 2/1975 | Kise | A47G 1/0638 40/792 |
| 4,013,613 A | 3/1977 | Abolins et al. | |
| 4,185,009 A | 1/1980 | Idel et al. | |
| 4,321,777 A | 3/1982 | Sauret et al. | |
| 4,551,372 A | 11/1985 | Kunert | |
| 5,235,026 A | 8/1993 | Wulff et al. | |
| 5,288,778 A | 2/1994 | Schmitter et al. | |
| 5,367,044 A | 11/1994 | Rosenquist | |
| 5,821,380 A | 10/1998 | Holderbaum et al. | |
| 5,883,165 A | 3/1999 | Kröhnke et al. | |
| 6,228,973 B1 | 5/2001 | McCloskey et al. | |
| 6,613,869 B1 | 9/2003 | Horn et al. | |
| 6,646,101 B2 | 11/2003 | Kratschmer et al. | |
| 7,074,351 B2 | 7/2006 | Döbler et al. | |
| 7,169,834 B2 | 1/2007 | Döbler et al. | |
| 7,425,358 B2 | 9/2008 | Heuer et al. | |
| 8,044,122 B2 | 10/2011 | Ruediger et al. | |
| 8,357,741 B2 | 1/2013 | Meyer et al. | |
| 8,845,920 B2 | 9/2014 | Meyer | |
| 2003/0064226 A1 | 4/2003 | Anders et al. | |
| 2003/0194561 A1 | 10/2003 | Bier et al. | |
| 2008/0081896 A1 | 4/2008 | Heuer | |
| 2008/0213545 A1 * | 9/2008 | Allam | B29C 45/14311 428/192 |
| 2009/0241317 A1 * | 10/2009 | Kubler | C03B 33/091 29/428 |
| 2015/0050484 A1 | 2/2015 | Meyer et al. | |

FOREIGN PATENT DOCUMENTS

| | | |
|---|---|---|
| DE | 2035390 A1 | 1/1971 |
| DE | 2248242 A1 | 4/1973 |
| DE | 2500092 A1 | 7/1976 |
| DE | 4240313 A1 | 6/1994 |
| DE | 19943642 A1 | 3/2001 |
| DE | 10006208 A1 | 8/2001 |
| DE | 10022037 A1 | 11/2001 |
| DE | 10311063 A1 | 9/2004 |
| DE | 102007011069 A1 | 9/2008 |
| EP | 0500496 A1 | 8/1992 |
| EP | 0517044 A2 | 12/1992 |
| EP | 0839623 A1 | 5/1998 |
| EP | 1308084 A1 | 5/2003 |
| EP | 1506249 A1 | 2/2005 |
| EP | 1559743 A1 | 8/2005 |
| EP | 1582549 A1 | 10/2005 |
| EP | 1865027 A1 | 12/2007 |
| FR | 2543535 A1 | 10/1984 |
| GB | 1409275 A | 10/1975 |
| GB | 2299052 A | 9/1996 |
| IT | RM20100225 A1 | 11/2011 |
| IT | RM20100227 A1 | 11/2011 |
| IT | RM20100228 A1 | 11/2011 |
| KR | 100738461 B1 | 7/2007 |
| WO | WO-9615102 A2 | 5/1996 |
| WO | WO-2002026862 A1 | 4/2002 |
| WO | WO-03095521 A1 | 11/2003 |
| WO | WO-2005113639 A1 | 12/2005 |
| WO | WO-2008037364 A1 | 4/2008 |

OTHER PUBLICATIONS

Written Opinion of the International Searching Authority for PCT/EP2015/069718 dated Oct. 9, 2015.

* cited by examiner

BEZEL FOR MOTOR VEHICLE GLAZING SYSTEMS

CROSS-REFERENCE TO RELATED APPLICATIONS

This application is continuation application of U.S. patent application Ser. No. 15/509,555, filed Mar. 8, 2017, which is a national stage application (under 35 U.S.C. § 371) of PCT/EP2015/069718, filed Aug. 28, 2015 which claims benefit of European Application No. 14184464.7, filed Sep. 11, 2014, both of which are incorporated herein by reference in their entirety.

The invention relates to a bezel for motor vehicle glazing systems, comprising a base layer, with a front side and a reverse side, and also sides connecting the front side and the reverse side. The invention further relates to a compound-structure system comprising bodywork of a vehicle and comprising a bezel.

The present invention accordingly relates to bezels with, at least in some regions, glass-like optical properties for motor vehicle glazing systems, and also to compound structures made of bezels for motor vehicle glazing systems and bodywork parts. Combinations of materials suitable for production of these are moreover described, as also is a process for the production of the compound structures.

Bezels for motor vehicle systems are known. In order to effect a transition between glazing systems and surrounding bodywork parts, bezels are often used in automobile construction. Not only do these bezels have to comply with the general requirements for exterior components in the automobile: within this context they also have to comply with ambitious detailed requirements. The visual appearance therefore has to at least match the good properties of glass, and indeed ideally is intended to exceed these. It must furthermore be ensured that these properties, examples being color depth, perceived blackness and perceived gloss, color and surface quality remain constant, or undergo only little change over long periods. High resistance of the entire structure to weathering is therefore required. Mechanical properties are moreover intended to be retained over a long period. The thermoplastic parts should moreover have adequate scratch resistance. A further intention is that the lacquer remains unchanged in the composite with the polycarbonate. Because the bezels often have a curved shape and edges and roundings, there are differences in lacquer-run-off behavior, leading to different layer thicknesses at different component positions. However, there should be compliance with a defined layer-thickness range over the entire component, including the edges. There should moreover be secure attachment of the bezel to the bodywork, and the bezel should not be damaged by thermal expansion or other mechanical influences. The bezel is moreover optionally intended to incorporate functional elements.

The selection of materials, and also the design of the bezel, should moreover provide the greatest possible extent of support to the function of the respective glazing system used. The latter is in particular true for movable glazing structures in the roof region of motor vehicles, examples being folding or sliding roofs. It is therefore an object of the present invention to provide bezels with, at least in some regions, glass-like visual appearance for motor vehicle glazing systems, where the bezels are preferably intended to have excellent optical properties, e.g. with respect to perceived blackness, color depth and gloss, and also high weathering resistance and adequate lacquer adhesion.

The bezels are usually multilayer systems comprising a base layer and a coating which is usually produced from one or more conventional lacquer layers. The coating is usually a UV-protection coating and/or scratch-resistant coating. By way of example, the coating comprises a base layer comprising UV absorber, and a scratch-resistant coating applied on said layer. In order to achieve ideal properties, the layer thicknesses of conventional clearcoat lacquers have to be within a defined layer thickness range. For ideal UV protection or for optimized processing time by way of example the layer thickness must be above a minimum. It is often also important that layer thicknesses are above a defined minimum in order to permit successful adhesive bonding of the bezel to the vehicle bodywork. However, excessive layer thicknesses of the coating can lead very rapidly to embrittlement, with resultant increased risk of cracking. The defects often have their source at the lateral edges of the components. Layer thicknesses of the coatings should therefore take into account the layer thicknesses stated by the manufacturers. However, different lacquer thicknesses conventionally occur across the surfaces of the bezels as a result of the possible shapes of the components and/or of lacquering processes such as dip-coating or flow-coating, therefore giving an undesired lacquer thickness profile. In particular, lacquer accumulations occur at the edges and corners of the bezels, especially at areas directly adjacent to ribs, and this leads to the abovementioned quality problems in practical situations.

It was therefore an object to provide bezels which avoid the above disadvantages and which, even in the edge region, are amenable to highly uniform coating.

The object addressed is achieved in the invention via a bezel as claimed in claim 1. This bezel, which is intended for motor vehicle glazing systems—but which can also be used elsewhere—comprises a base layer based on a thermoplastic, with a front side and a reverse side, and also sides connecting the front side and the reverse side, characterized in that the edges between the sides connecting the front side and the reverse side of the base layer and the reverse side of the base layer have been rounded; wherein the bezel has a coating on the front side and in the rounded edge region of the front side; wherein the rounding has a radius that is variable across the rounding.

The expression "front side" in the invention means the side of the bezel that by way of example in the case of a bezel installed in a motor vehicle faces outward. The term "edges" in the plural takes account of the arrangement of the edges in predominantly different spatial directions. Because there is usually no distinct boundary between the edges at the various sides of the bezel, the term "edges" also means a coherent edge running around the bezel.

The expression "has a coating on the front side" preferably means that the coating is also present in the edge region, i.e. in the region of the rounded edge adjacent to the front side of the bezel. It is particularly preferable that the coating covers the entire front side and the entire edge region directly adjacent to the front side.

Preference is given in the invention to the edge-rounding shapes described hereinafter because for these it has been found that the lacquer for a coating applied to a base layer of the bezel is particularly uniformly distributed on the base layer of the bezel, and thus forms a uniformly thick coating across the surface of the front side/reverse side of the bezel.

The term "rounding" in the invention means that the transition between two areas does not take the form of a sharp edge but instead has been rounded. This means outward curvature when viewed from the interior of the base layer.

The invention also comprises embodiments having curvature of the entire bezel surface, including the front side and optionally also the reverse side; this means that the front side and the reverse side of the base layer do not necessarily have to be flat surfaces.

In a first advantageous embodiment of the invention, not only have the edges between the sides connecting the front side and the reverse side of the base layer and the front side of the base layer been rounded in the invention: the edges between the sides connecting the front side and the reverse side of the base layer and the reverse side of the base layer have also been rounded; the bezel here preferably has a coating on the reverse side. In the case of additional rounding between the sides connecting the front side and the reverse side of the base layer and the reverse side of the base layer, it is preferable that this rounding, too, has variable radius.

In another advantageous embodiment of the invention, in relation to the reverse side and the front side of the bezel, the bezel is U-shaped, O-shaped, double-O-shaped, T-shaped or I-shaped. Other shapes are, of course, also possible.

In a preferred embodiment, adjacent to the rounded edge on that side of the bezel that has a coating there is a transition region which has no rounding and which, in cross section through the front side and the reverse side of the bezel, is characterized by an ascending straight line and provides a transition between the rounded edge region and the front side/reverse side of the bezel—the coated side of the bezel. In so far as only the front side of the bezel has been coated, this type of transition region is present between the rounded edge that is in the direction of the front side and the surface of the front side of the bezel. This rounded edge that is in the direction of the front side is termed here "upper rounded edge" and the rounded edge that is in the direction of the reverse side is termed here "lower rounded edge". An upper and a lower rounded edge can be present simultaneously, but this is not essential. It is preferable that the upper rounded edge and the lower rounded edge are connected either via a straight-line transition region oriented perpendicularly to, or substantially perpendicularly to, the front side and reverse side, along the edge of the sides connecting the front side and the reverse side of the bezel, or via the furthest outward situated point of the rounding, or else that there is an immediate transition between the upper rounded edge and the lower rounded edge.

If the bezel has been attached in the transition region between the bodywork and a transparent roof module, it is preferable that the front side of the bezel is flush with the outer contour of the motor vehicle.

In particular, if a coating is present only on the front side of the base layer, the upper rounded edge has a larger radius than the lower rounded edge. Bezels of the invention can also have only an upper rounded edge; the lower edge can remain angular.

The rounding, in particular at the upper rounded edge, alternatively preferably has the shape of, or approximately the shape of, a Bézier curve, in particular a quadratic or cubic Bézier curve. The rounding at the lower rounded edge can also have the shape of, or approximately the shape of, a quadratic or cubic Bézier curve. It is particularly preferable that there is a direct transition between the rounding by way of this Bézier curve and the surface of the front side/reverse side of the bezel.

A Bézier curve is a parametric curve which can be used in description of freeform curves and surfaces. Very particular preference is given in the invention to cubic Bézier curves.

Four points ($P_0$, $P_1$, $P_2$ and $P_3$) determine a cubic Bézier curve. The curve begins at $P_0$ and proceeds in the direction of $P_1$ and then proceeds from the direction of $P_2$ to $P_3$. The curve does not generally proceed through $P_1$ and $P_2$—these points serve merely to state the direction; $P_1$ here determines the direction in which the curve reaches $P_0$. $P_2$ defines the direction from which the curve reaches $P_3$. The distance between $P_0$ and $P_1$ and the distance between $P_2$ and $P_3$ determine "how far" the curve proceeds in the direction of the control points $P_1$ and $P_2$ before it proceeds in the direction $P_3$.

$$C(t) = \sum_{i=0}^{3} \binom{3}{i} t^i (1-t)^{3-i} P_i$$
$$= (1-t)^3 P_0 + 3t(1-t)^2 P_1 + 3t^2(1-t) P_2 + t^3 P_3$$
$$= (-P_0 + 3P_1 - 3P_2 + P_3)t^3 + (3P_0 - 6P_1 + 3P_2)t^2 +$$
$$(-3P_0 + 3P_1)t + P_0 \cdot t \in [0, 1]$$

Expressed with the aid of the De-Casteljau algorithm this is: $C(t)=C_0^3(t)$ $$C_0^3(t) = (1-t)\{\underbrace{(1-t)\overbrace{[(1-t)P_0 + tP_1]}^{c_0^1(t)} + t\overbrace{[(1-t)P_1 + tP_2]}^{c_1^1(t)}}_{c_0^2(t)}\} +$$

$$t\{\underbrace{(1-t)\overbrace{[(1-t)P_1 + tP_2]}^{c_1^1(t)} + t\overbrace{[(1-t)P_2 + tP_3]}^{c_2^1(t)}}_{c_1^2(t)}\}$$

Evaluation at the points with $\tilde{t}=t$ gives the Bézier curve: $C_0^3(t)=\tilde{C}_0^3(t,t)$.

The radius r for a point on the rounded edge, viewed within the cross section through the front and the reverse side of the bezel, is equal to the radius of an imaginary circle on which the point would lie. The radius r is preferably variable across the length of the region of the rounded edge, i.e. for various points on the rounded edge there are various imaginary circles. This type of rounding with integration of a transitional curve has proven to be extremely advantageous in the invention.

It is also preferable that a clothoid is used for the transition into the surface region of the front side of the bezel and/or of the reverse side of the bezel.

The width b measured from the external edge of the bezel, i.e. from the outermost point P of the bezel on side of the side connecting the front side and the reverse side of the base layer, to the end E of the curve of a rounded edge is preferably at least 1 mm, more preferably at least 1.5 mm, very particularly preferably at least 2 mm, particularly preferably at least 2.5 mm, very particularly preferably at least 3 mm.

The width b of the lower rounded region between the sides connecting the front side and the reverse side of the base layer and the reverse side of the base layer is preferably less than 2 mm, particularly preferably less than 1.75 mm, very particularly preferably less than 1.5 mm.

If the bezel is imagined as arranged in a coordinate system, the sides connecting the reverse side and the front side of the bezel connect these along the z-direction. The front side and the reverse side of the bezel lie, or lie approximately, within an x/y-plane. It is preferable in the invention that, alongside the rounding, essential in the invention, of the edges between the sides connecting the front side and the reverse side of the bezel and the front side of the bezel and/or between the sides connecting the front side and the reverse side of the bezel and the reverse side of the bezel, angles/corners resulting from the transition regions of the legs extending longitudinally in the x/y-plane of the bezel have also been rounded.

The term "leg" when applied to a bezel means a section which is part of a bezel and which adjoins, at an angle, another section in the same plane of a bezel.

The expression "internal angle R1" describes the rounded region of the angle in the transition region between two legs. It is preferable that the internal angle R1 in the imaginary x/y-plane describes, precisely or at least approximately, a quadrant. In order to minimize stresses in the component during thermal expansion, the radius of this quadrant is preferably at least 8 mm, ideally at least 10 mm. It is moreover preferable that, in addition to this rounded shape of the internal angle, the edge-rounding between the sides connecting the front side and the reverse side of the base layer and the front side of the base layer follows a Bézier curve.

Total expansion values <1%, in particular <0.8%, are desirable. The radius of the internal angle R1 between the legs, and also the edge-rounding, are important parameters particularly when the component is then coated with a scratch-resistant coating. Large stresses lead to premature failure of the lacquer. Thermal expansion of bezels of particular shapes produces very complex deformation which leads to high tensile stress on the upper side of the bezel, the magnitude of which increases continuously in the direction of the perimeter, in particular in the "interior corner region". As the distance between the external edge and the neutral fiber for this particular type of loading decreases, the expansion values also decrease.

This problem is solved by minimizing the wall thickness of the bezel. The wall thickness is preferably from 1.5 mm to 5 mm, particularly preferably from 2 mm to 3.5 mm. The expression "wall thickness" in the invention means the largest distance between front side and reverse side of the bezel comprising the base layer and the coating. In the event of expansion at low temperature, the legs are bent outward (approximately linearly). As the radius of the internal angle R1 decreases here, the local stresses (notch effects) increase. A compromise therefore has to be found between technical and design requirements.

It is therefore preferable that there is rounding of all of the straight edges simultaneously in all directions, i.e. in the x/y-plane and also in z-direction.

Surprisingly, it has been found that the molded part of the invention has improved lacquerability. In particular, the molded part can be lacquered substantially more uniformly, and this is discernible in a more uniform layer thickness profile. It is thus possible to achieve control of, and compliance with, the minimal and maximal layer thickness for a given lacquer. This is in particular true for an edge that is furthest upstream in the direction of lacquer flow and drip edge. This results in improved color depth when by way of example colored lacquers are used, or improved weathering properties when functional lacquers are used.

Another advantage is, without any intention to be bound to a particular theory, that by virtue of the shaping of the edge that is situated lowest in the coating process, the drip edge is placed behind the visible region and thus behind the weathering edge of the installed molded part, thus giving improved weathering properties.

The bezels of the invention are preferably used
   in the transition region between vehicle roof (bodywork) and transparent roof modules, preferably transparent panorama roof modules, folding roof modules or sliding roof modules,
   in the transition region between engine hood and windshield, in the transition region between A-column or A-column cladding and windshield or
   in the transition region between tailgate window and vehicle roof or
   as cladding for B-column, C-column and D-column.

The bezels of the invention are connected to the vehicle bodywork directly or by way of a support frame which can have been manufactured from metal or plastic. The connection between bezel and frame, and also between frame and vehicle bodywork, can be realized via adhesive bonding and/or use of screw threads and/or by way of snap connections. If the bezel is connected directly to the vehicle bodywork, this is preferably achieved by way of adhesive bonding.

The adhesive-bonding procedure can use wet adhesives, contact adhesives, hotmelt adhesives or reactive adhesives. Materials particularly suitable for this technology are single- or two-component polyurethane-based structural adhesives with a variety of stiffness properties. However, it is also possible by way of example to use acrylic/acrylate-, methyl-methacrylate-, silicone- or epoxy-resin-based adhesives. The adhesive can also be a thermoplastically processable hot-melt adhesive.

The nature of the adhesive bead in the case of bezels of the invention is preferably such that the bezel has maximal freedom of deformation and expansion effects are therefore distributed over a large, broad area. In order to achieve the best possible positioning of the adhesive bead in the invention, therefore, the region around the internal angle between two mutually contacting legs should as far as possible be free from adhesive bonding; the adhesive bead should specifically be interrupted here. It has moreover proven to be advantageous to apply the adhesive bead with additional interruptions along the legs. It is preferable that the adhesive bead has been distributed in the form of thin strips centrally on the two externally situated legs, and moreover in the form of an elongated rectangle with rounded edges on the leg connecting the two externally situated legs.

It is preferable that the width of the adhesive layer is from 5 mm to 20 mm and that its thickness is from 0.5 mm to 10 mm. It is particularly preferable that the width of the adhesive layer is from 10 mm to 15 mm and that its thickness is from 3 mm to 6 mm. The dimension of the adhesive layer in the third direction depends on the dimensions of the component. It is preferable to use a two-component adhesive of maximal softness with Shore A hardness from 50-85. The hardness of the adhesive is particularly preferably from 60-75 Shore A.

Preference is given to the bezel design of the invention in those bezels which additionally have at least one rib in the perimeter region, at or close to the external edge of the bezel. Ribs are usually provided in order to increase stiffness and thus to facilitate subsequent installation. They can also serve as installation guides here in that their height prescribes the distance between the external surface and the substructure. They can also serve to receive or fix by way of example sealing lips.

In the case of elements produced as one-piece injection molded parts, ribs lead to local mass increases; on cooling this can cause shrinkage of the material at these locations, resulting in depressions at the surface of the element. Even if the extent of the depression is minimized and the depression is not actually visible, these depressions are in principle problematic during coating, because accumulations of lacquer can occur in these, with resultant delayed runoff; this leads to disadvantageous lacquer flow, runs and/or curtaining. In order to minimize production of depressions, it is preferable that the ratio of the width of the rib to the wall thickness of the base layer of the bezel is at most 1:2. The edge-rounding of the invention, preferably implemented in such a way that the rounding proceeds as far as the area behind the ribs, and therefore as far as the area behind the depression, can firstly render the depression in the base layer invisible and can secondly permit better runoff of the lacquer in this region.

There can be conventional functional elements incorporated into the bezels of the invention. These functional elements that can have been integrally shaped, molded and/or bonded within/into the bezels of the invention are in particular:

a) antennas, for example for the reception of analog or digital radio signals, GPS and/or UMTS, where for the purposes of the present invention the antennas can be realized by way of functionalized foils applied to part of, or all of, that surface of the bezel that faces toward the passenger compartment, i.e. foils applied to the reverse side of the bezel. It is also alternatively possible that the antennas are applied directly to the bezel surface via suitable printing processes, preference being given for the purposes of the present invention to printing by, for example, aerosol jet printing, or by the screen-printing process;

b) screw domes, engraved areas for adhesive beads, ribs, snap-connection elements;

c) decorative effects or logos, preferably applied by way of transparent printed foils on the side facing away from the passenger compartment—i.e. on the front side of the bezel—to part or all of the surface of the bezel;

d) functional elements for water management, and also spoilers, which in both cases for the purposes of the invention are preferably not molded-on elements but, by virtue of functional design, an integral constituent of the actual bezel;

e) driver-assistance systems/theft protection, examples being distance radar, toll registration systems and monitoring systems;

f) transparent polycarbonate/PMMA foils for UV-protection, preferably applied to all of the front side of the bezel, i.e. on that side of the bezel that is directed toward the environment of the vehicle;

g) a black foil attached to all of the surface of the reverse side of the bezel;

h) elements in the form of a foil or of an additional coating for heat management via additional IR reflection/IR absorption.

It has been found advantageous to use the bezels of the invention in the form of a multilayer system. This has the particular advantage, by virtue of the various layers, of allowing compliance with the strict requirements placed upon mechanical and thermal properties, and at the same time ensuring high scratch resistance and good protection from weathering.

For the purposes of the present invention it has proven advantageous to provide additional layers as follows as external coating to a base layer based on a thermoplastic, in particular on polycarbonate, where other layers present are preferably the following, in each case on the front side and optionally on the reverse side of the bezel:

a two-layer coating made of a primer and of an outer lacquer layer, where the primer optionally comprises a UV absorber and/or the outer layer is preferably polysiloxane-based, in each case on the front side and/or the reverse side of the bezel, where the reverse side of the bezel means the side of the bezel facing toward the passenger compartment and the front side of the bezel means the side of the bezel directed toward the environment of the vehicle, or a single-layer coating in the form of a clearcoat lacquer (e.g. UV-curing or thermally curing lacquer), or a single-layer coating in the form of a polysiloxane lacquer or of a polyurethane-based lacquer system.

The expression "based on a thermoplastic" means that the component predominantly present in the material of the base layer is a thermoplastic. The composition of which the base layer is composed can comprise content of other thermoplastics or additives.

Between the base layer and the coating there can be an additional layer arranged, for example a polycarbonate layer. This layer is preferably a coextruded foil made of polycarbonate, particularly preferably a polycarbonate foil with thin PMMA layer, where the PMMA layer is external, on the front side of the bezel, or a multilayer foil made of polycarbonate, of an IR-reflective layer made of polycarbonate and optionally other layers.

It is also possible to integrate functions into the layer structure by way of plasma layers. These functions can be: scratch-resistant coatings, hydrophobic and hydrophilic properties, antireflective layers, etc. It is preferable that the plasma layer is a hard coating deposited via plasma processes, for example a glassy layer, composed of siloxanes.

Thermoplastics which can be used for the production of the bezels of the invention, the base layer therefore being based on these, are in particular polycarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), polyamide, cyclic polyolefin, poly- or copolyacrylates and poly- or copolymethacrylate, for example poly- or copolymethyl methacrylates (such as PMMA), and also copolymers with styrene, for example transparent polystyrene-acrylonitrile (PSAN), thermoplastic polyurethanes, polymers based on cyclic olefins (e.g. TOPAS®, a product commercially available from Ticona), preferably polycarbonate, copolycarbonate, polyester carbonate, aromatic polyesters or polymethyl methacrylate or a mixture of the components mentioned, particular preference being given to polycarbonate and copolycarbonate.

Suitable polycarbonates for the production of the plastics composition of the invention are any of the known polycarbonates. These are homopolycarbonates, copolycarbonates and thermoplastic polyester carbonates.

Mixtures of a plurality of thermoplastic polymers are also suitable as material for the base layer, in particular when they can be mixed with one another to give a transparent material, preference being given here to a mixture of polycarbonate with PMMA or polyester.

The content of PMMA is particularly preferably 0.2% by weight, very particularly preferably 0.1% by weight, based on the quantity of polycarbonate, the molar mass (weight average) of the PMMA here preferably being <40 000 g/mol.

A particularly suitable material for the base layer of the bezels of the invention is a composition comprising the following components:
- at least one thermoplastic, preferably polycarbonate, with particular preference a polycarbonate based on bisphenol A or a polycarbonate blend, more preferably with a melt volume rate of
  i. from 7 $cm^3$/(10 min) to 25 $cm^3$/(10 min),
  ii. preferably from 9 to 21 $cm^3$/(10 min), determined in accordance with ISO 1133 (at 300° C. with 1.2 kg load),
- nanoscale carbon black, preferably in a quantity of
  i. from 0.05 to 0.50% by weight,
  ii. preferably from 0.06 to 0.25% by weight,
  iii. with particular preference from 0.08 to 0.20% by weight,
- and also a mold-release agent based on a fatty acid ester,
  i. preferably a stearic ester,
  ii. with particular preference based on pentaerythritol, preferably at a concentration of from 0.1 to 0.5% by weight,
  iii. with particular preference from 0.20 to 0.45% by weight.

It is, of course, possible here to combine the features of the preferred levels i. to iii. with one another in any desired manner.

Nanoscale carbon black used preferably comprises pigment blacks. The average primary particle size of these, determined by scanning electron microscopy, is preferably less than 100 nm, preferably from 10 to 99 nm, more preferably from 10 to 50 nm, particularly preferably from 10 to 30 nm, in particular from 10 to 20 nm. Particular preference is given to pigment blacks of which the particles are particularly fine.

Carbon blacks that are obtainable commercially and are suitable for the purposes of the invention are obtainable with a wide variety of trademarks and in a wide variety of forms, for example pellets or powders: suitable carbon blacks are obtainable with the trademark BLACK PEARLS®, as wet-processed pellets with trademarks ELFTEX®, REGAL® and CSX®, and in the form of flakes as MONARCH®, ELFTEX®, REGAL® and MOGUL®, all from Cabot Corporation. Preference is in particular given to carbon blacks marketed with trademark BLACK PEARLS® (CAS No. 1333-86-4).

Another preferred composition of the base layer comprises a mixture of polycarbonate and PMMA with less than 2.0% by weight, preferably less than 1.0% by weight, more preferably less than 0.5% by weight, of PMMA, where at least 0.01% by weight of PMMA is present, based on the quantity of polycarbonate, where the molar mass (weight average) of the PMMA is preferably <40 000 g/mol.

It is particularly preferable that there is, on at least one side of the base layer, a polysiloxane-based scratch-resistant coating comprising at least one UV absorber, where the thickness of the scratch-resistant layer is preferably from 2 µm to 15 µm, with particular preference from 4.0 µm to 12.0 µm.

It is very particularly preferable that, arranged on the base layer, there is at least one adhesion-promoting layer (primer layer) between the base layer and the scratch-resistant layer comprising at least one UV absorber, where the thickness of the primer layer is preferably from 0.3 µm to 6 µm, with particular preference from 1.2 µm to 4.0 µm.

The respective bezel can, as desired, be realized as single-component or two-component injection molding. When a bezel used takes the form of a 2-component injection molding it is preferable for the purposes of the present invention that one component is transparent, and also that one component is not transparent. It is moreover preferable here to install the bezel in such a way that the transparent component of the bezel is directed toward the external side of the vehicle. The meaning of transparent in this context is that at least the outline of an object situated behind the bezel is visible to the human eye when the object is covered by the bezel. The meaning of transparency in the invention is therefore light transmittance Ty (10°, D65) greater than 5% and haze less than 5%, measured in accordance with ASTM D 1003. Ty (10°, D65) here is calculated in accordance with ASTM E308 and is equal to Y10, based on the standard D65 light source.

A preferred embodiment of the invention is a U-bezel produced as single-component injection molding made of a polycarbonate as base layer, comprising nanoscale carbon black, where the bezel is a multilayer compound-structure system, i.e. a system made of at least two layers, where one layer is a scratch-resistant coating. Scratch resistance in the invention means a gloss level reduction of at most 20 units, determined in accordance with the Amtec-Kistler test (ISO 20566).

In another preferred embodiment there is, applied on both sides of the base layer, in each case an adhesion-promoting layer, and also a scratch-resistant layer. The primer layer preferably comprises an organic binder, preferably PMMA-based, which promotes adhesion between the composition based on the thermoplastic material, which is preferably polycarbonate, and the scratch-resistant coating, preferably a polysiloxane-based lacquer.

Rubber-modified vinyl(co)polymers can be used as blend constituents. Examples of particularly preferred rubber-modified vinyl(co)polymers are ABS polymers (emulsion ABS, bulk ABS and suspension ABS; ABS=acrylonitrile-butadiene-styrene), these being as described by way of example in DE 2 035 390 A (U.S. Pat. No. 3,644,574 A) or DE 2 248 242 A (GB 1 409 275 A) or in Ullmann, Enzyklopädie der Technischen Chemie [Ullmann's Encyclopedia of Industrial Chemistry], vol. 19 (1980), pp. 280 ff.

The polycarbonates are preferably produced by the interfacial process or the melt transesterification process, these being known to the person skilled in the art and widely described in the literature.

For the interfacial process reference may be made by way of example to H. Schnell, "Chemistry and Physics of Polycarbonates", Polymer Reviews, vol. 9, Interscience Publishers, New York 1964 pp. 33 ff., to Polymer Reviews, vol. 10, "Condensation Polymers by Interfacial and Solution Methods", Paul W. Morgan, Interscience Publishers, New York 1965, chapter VIII, p. 325, to Dres. U. Grigo, K. Kircher and P. R. Müller "Polycarbonate" in Becker/Braun, Kunststoff-Handbuch [Plastics Handbook], vol. 3/1, Polycarbonate, Polyacetale, Polyester, Celluloseester [Polycarbonates, Polyacetals, Polyesters, Cellulose Esters], Carl Hanser Verlag, Munich, Vienna, 1992, pp. 118-145, and also to EP 0 517 044 A1.

The melt transesterification process is described by way of example in Encyclopedia of Polymer Science, vol. 10 (1969), Chemistry and Physics of Polycarbonates, Polymer Reviews, H. Schnell, vol. 9, John Wiley and Sons, Inc. (1964), and also in the patent specifications DE 10 31 512 B and U.S. Pat. No. 6,228,973 B1.

The polycarbonates are preferably produced via reactions of bisphenol compounds with carbonic acid compounds, in particular phosgene, or in the melt transesterification process from diphenyl carbonate or dimethyl carbonate.

Particular preference is given here to homopolycarbonates based on bisphenol A and to copolycarbonates based on the monomers bisphenol A and 1,1-bis(4-hydroxyphenyl)-3,3,5-trimethylcyclohexane.

These and other bisphenol compounds or diol compounds that can be used for polycarbonate synthesis here are disclosed inter alia in WO 2008/037364 A1 (p. 7, line 21 to p. 10, line 5), EP 1 582 549 A1 ([0018] to [0034]), WO 2002/026862 A1 (p. 2, line 20 to p. 5, line 14), WO 2005/113639 A1 (p. 2, line 1 to p. 7, line 20).

The polycarbonates can be linear or branched. It is also possible to use mixtures of branched and unbranched polycarbonates. Suitable branching agents for polycarbonates are known from the literature and are described by way of example in the patent specifications U.S. Pat. No. 4,185,009 A and DE 25 00 092 A1 (inventive 3,3-bis(4-hydroxyaryloxindols), see in each case entire document), DE 42 40 313 A1 (see p. 3, lines 33 to 55), DE 19 943 642 A1 (see p. 5, lines 25 to 34), and also U.S. Pat. No. 5,367,044 A and literature cited therein. The polycarbonates used can moreover also have intrinsic branching, no branching agent being added here for the purposes of production of the polycarbonate. An example of intrinsic branching is what are known as Fries structures as disclosed for melt polycarbonates in EP 1 506 249 A1.

Production of the polycarbonate can moreover use chain terminators. Chain terminators used preferably comprise phenols such as phenol, alkylphenols such as cresol and 4-tert-butylphenol, chlorophenol, bromophenol, cumylphenol or a mixture of these.

The polycarbonates can moreover comprise conventional polymer additives, for example the flame retardants, optical brighteners, flow improvers, organic or inorganic colorants, heat stabilizers, inorganic pigments, mold-release agents or processing aids described in EP 0 839 623 A1, WO 96/15102 A2, EP-A 0 500 496 A1 or in "Plastics Additives Handbook", Hans Zweifel, 5th edition 2000, Hanser Verlag, Munich. UV absorbers or IR absorbers can moreover be present. Suitable UV absorbers are described by way of example in EP 1 308 084 A1, in DE 10 2007 011 069 A1, and also in DE 10311063 A1. Suitable IR absorbers are disclosed by way of example in EP 1 559 743 A1, EP 1 865 027 A1, DE 10022037 A1, DE 10006208 A1, and also in the Italian patent applications RM2010A000225, RM2010A000227, and also RM2010A000228. Among the IR absorbers mentioned in the cited literature, preference is given to those based on boride and on tungstate, and also to absorbers based on ITO (indium tin oxide) and ATO (aluminum tin oxide), and also combinations thereof.

It is preferable that the thermoplastic is a polycarbonate with molar mass $M_w$ from 22 000 g/mol to 30 000 g/mol, more preferably from 24 000 g/mol to 28 000 g/mol and particularly preferably from 25 000 g/mol to 27 000 g/mol, determined via gel permeation chromatography with polycarbonate calibration.

It has proven advantageous for the purposes of the present invention that the bezels of the invention are produced with the aid of injection-molding technology by the following operations:
  optional insertion of a foil into the injection mold,
  closure of the mold,
  injection of a first polymer composition, preferably by way of injection-compression molding or cascade injection molding, then cooling to a maximal component temperature lower than the glass transition temperature,
  optional rotation of the cavity into the next position for purposes of injection of a second polymer composition, in such a way that on closure of the mold in this position an intervening space is produced between the first hardened polymer composition and the mold wall,
  optional injection of the second polymer composition, then cooling to a maximal component temperature lower than the glass transition temperature.

An example of a method for the coating that follows the production of the base layer of the bezels, for example as described above, is as follows:
  demolding,
  cooling of the component to room temperature,
  coating of the component with the primer, for example with a PMMA-based primer system, preferably comprising UV-protection, where the coating method here can be flow coating, dip coating or spraying,
  evaporation of the solvents until the material is dry to the touch,
  stoving of the primer at at least 125° C., where the stoving period is preferably at least 15 min at object temperature >125° C.,
  cooling to room temperature,
  coating with outer lacquer, preferably with a polysiloxane-based outer lacquer, preferably by way of flow coating or dip coating,
  evaporation of the solvents, preferably until the material is dry to the touch,
  stoving of the outer lacquer at an object temperature of at least 125° C., preferably for a period of at least 30 minutes at object temperature >125° C.,
  cooling to room temperature.

The coating can alternatively be achieved by means of a known direct coating step following injection molding, preferably as follows:
  rotation of the cavity into the next position for purposes of injection of the polyurethane (PU) component. On closure of the mold in this position an intervening space arises between the first hardened polymer composition and the mold wall (this step can also optionally take place after in-mold coating with the second polymer composition),
  injection of a polyurethane system,
  demolding,
  cooling to room temperature.

It is also possible to use a second mold with another cavity, instead of rotation of the cavity during production of the base layer or during the coating process.

A visually attractive bezel is obtained with excellent, glass-like surface, good high-gloss appearance without depressions, and particularly high scratch resistance.

The invention is explained in more detail below with reference to some drawings depicting preferred embodiments.

Figure 2:
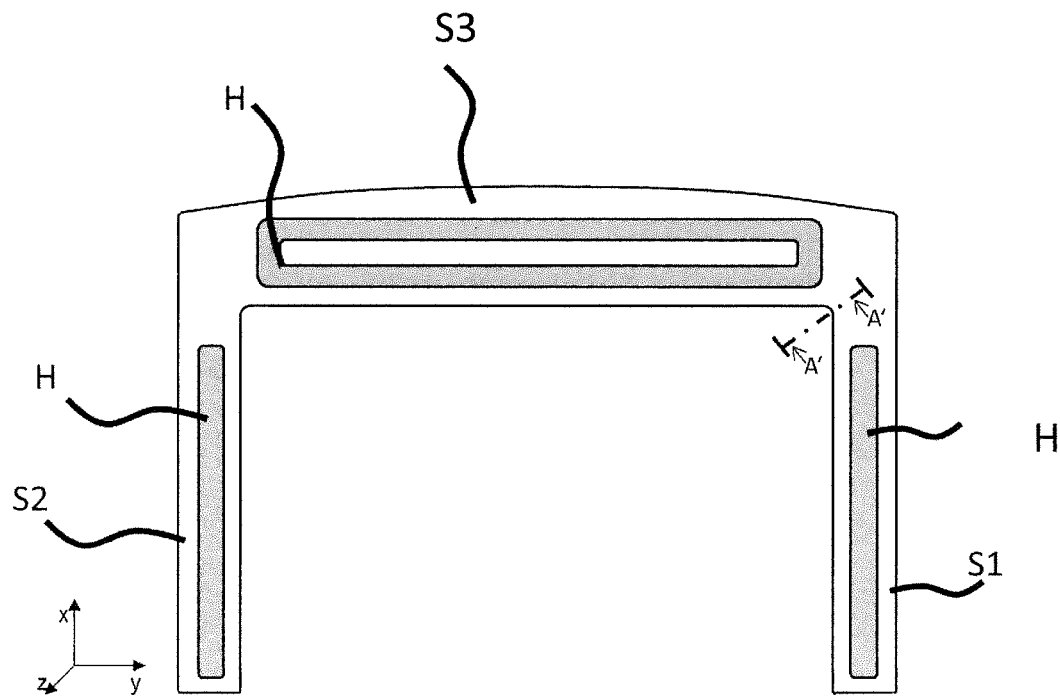
Figure 3A:
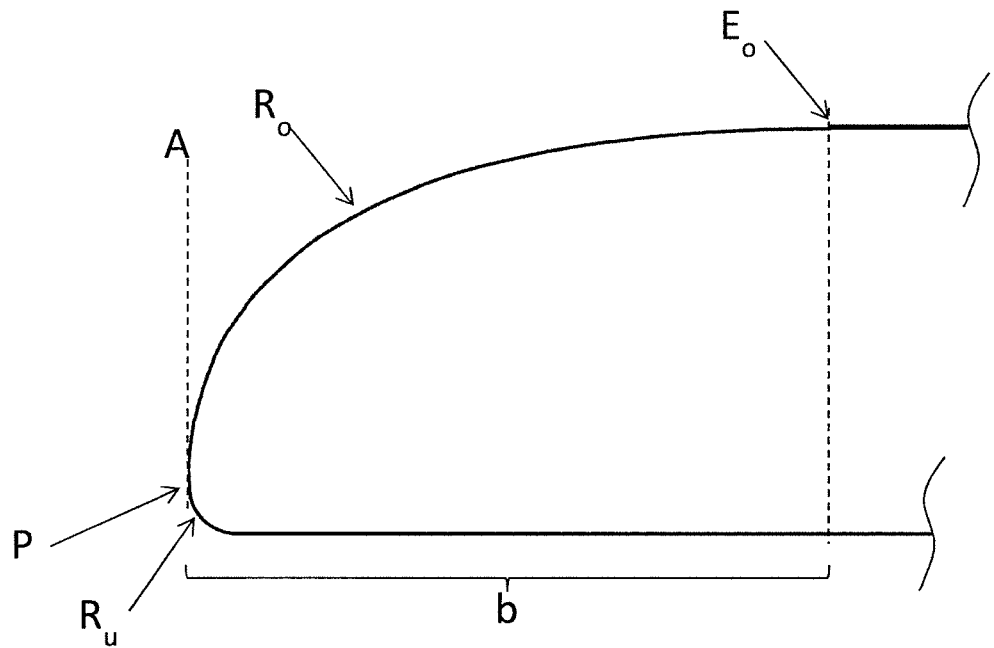
Figure 3B:
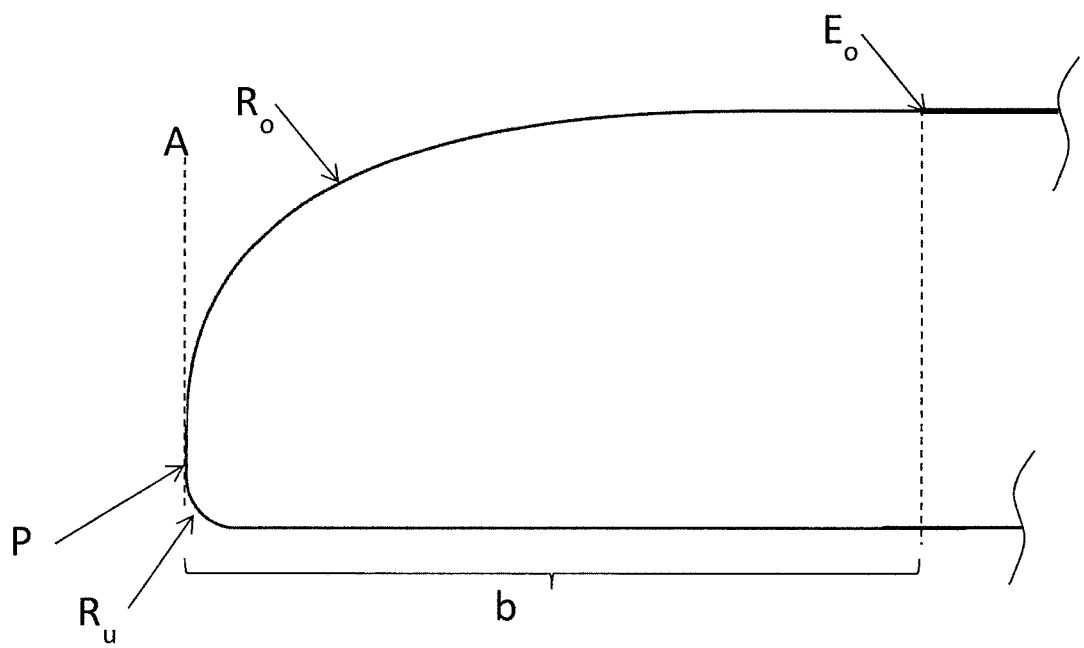
Figure 3C:
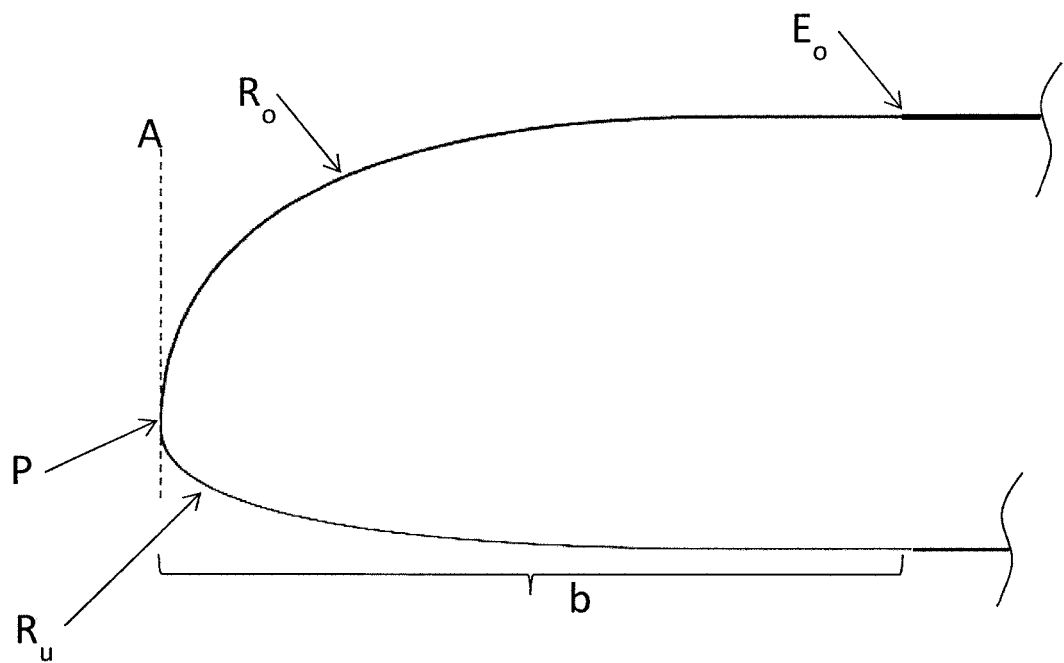
Figure 3D:
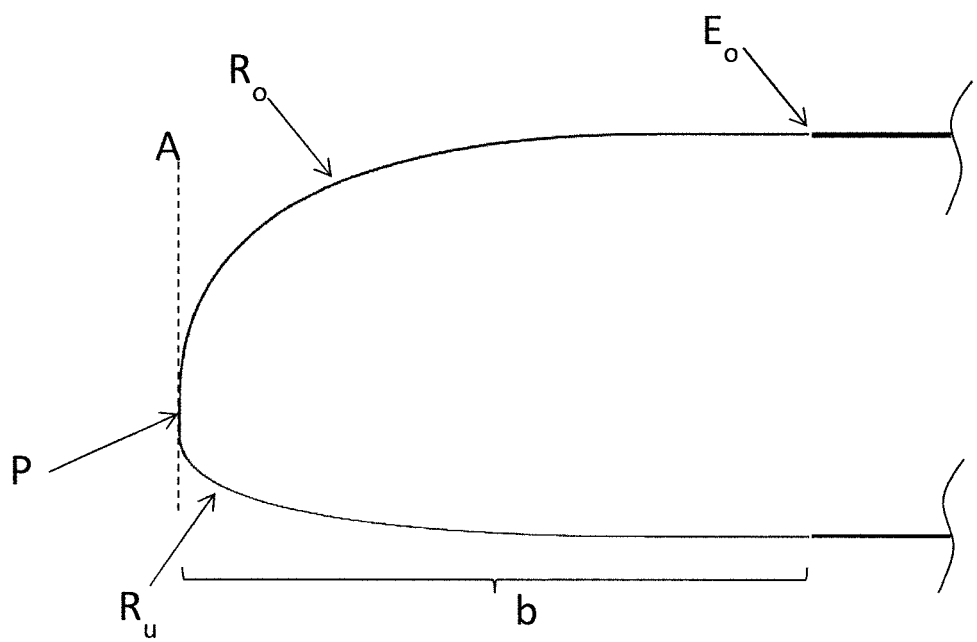
Figure 3E:
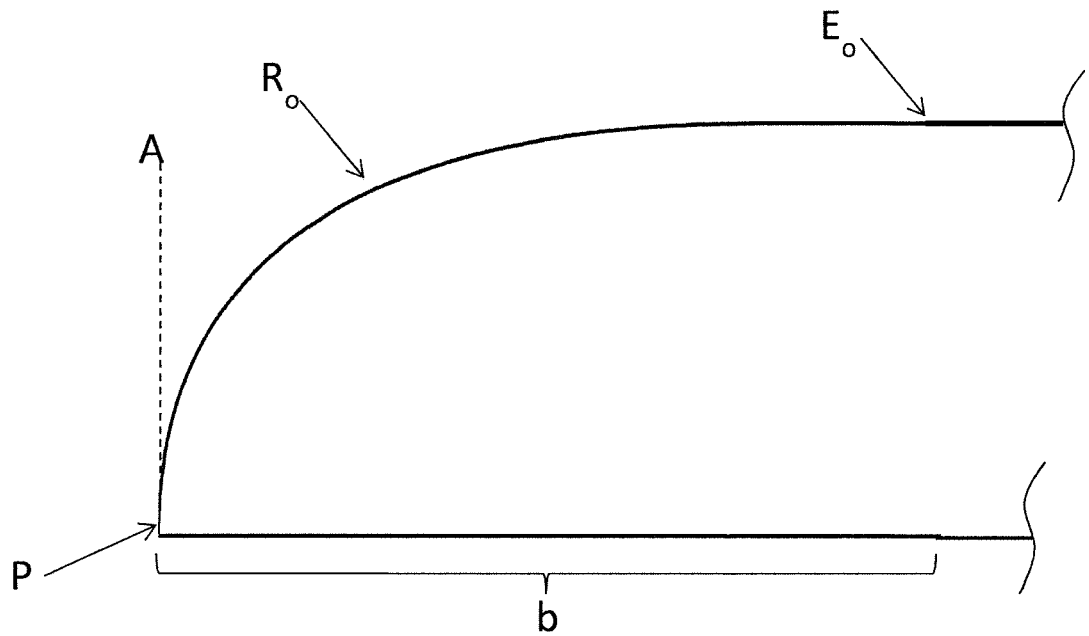
Figure 3F:
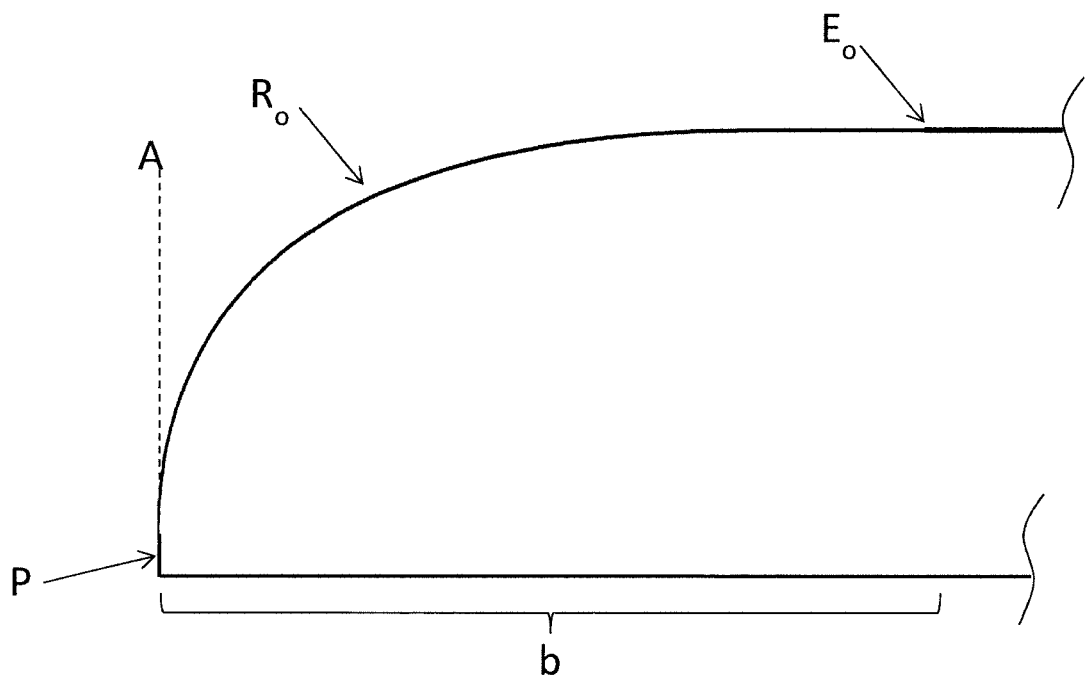
Figure 4:
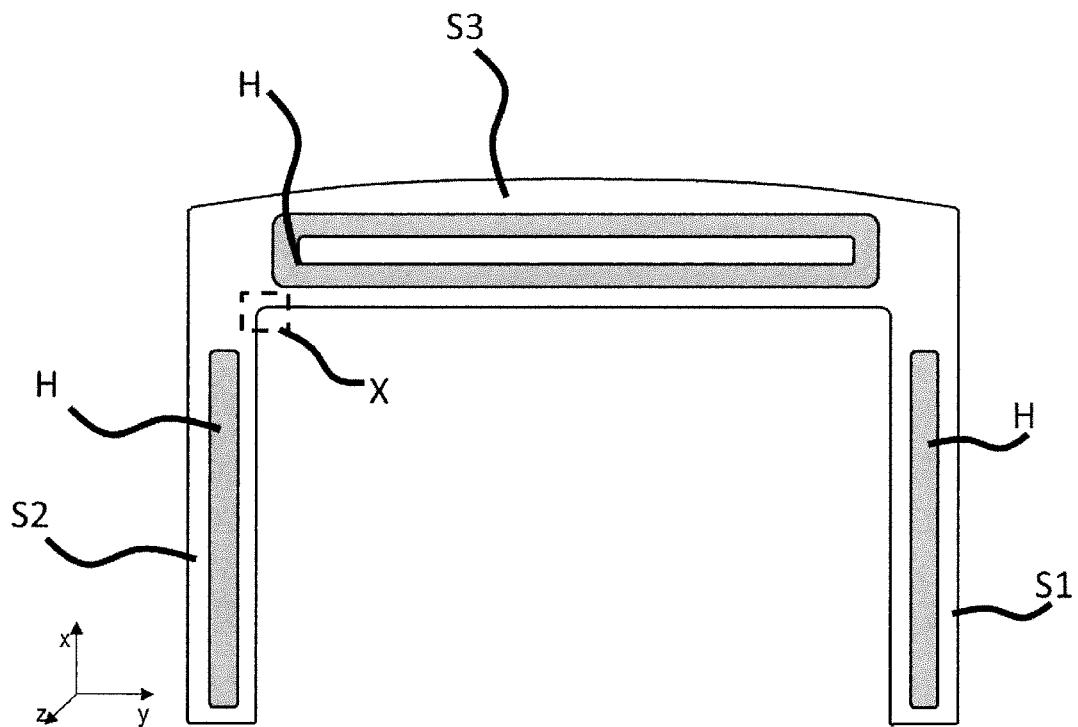
Figure 5A:
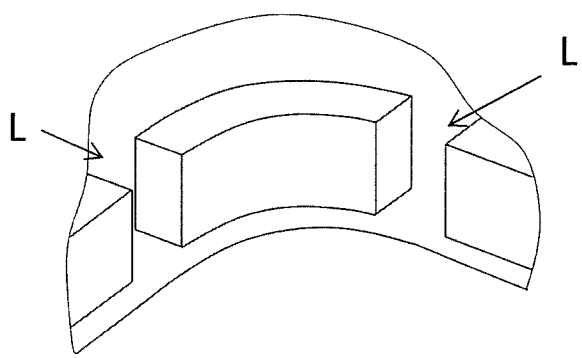
Figure 5B:
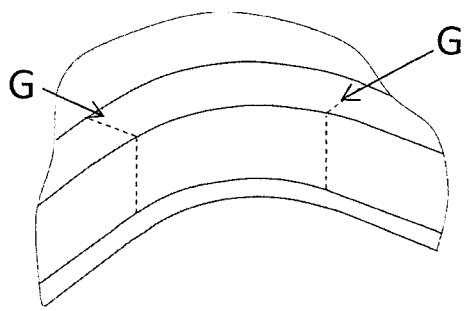
Figure 5C:
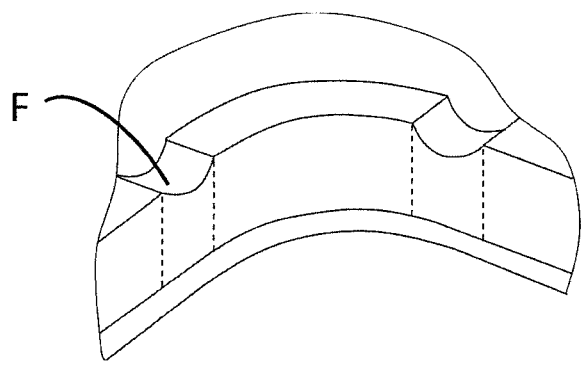
Figure 6A:
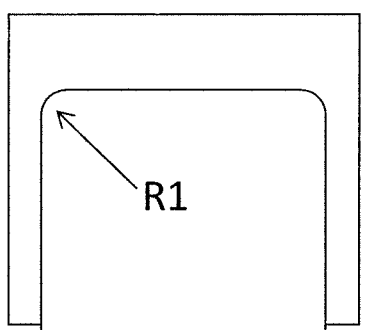
Figure 6B:
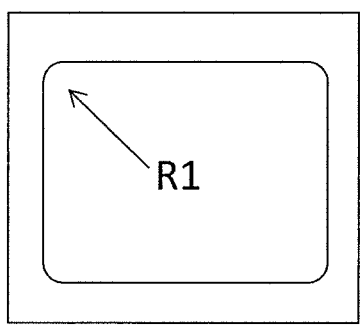
Figure 6C:
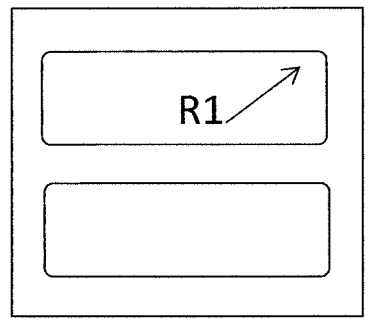
Figure 6D:
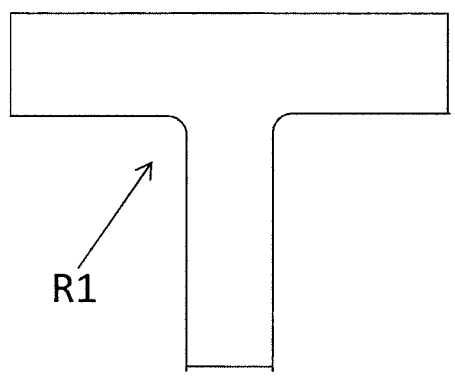
Figure 6E:
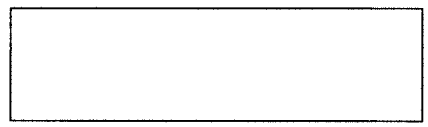
Figure 7:
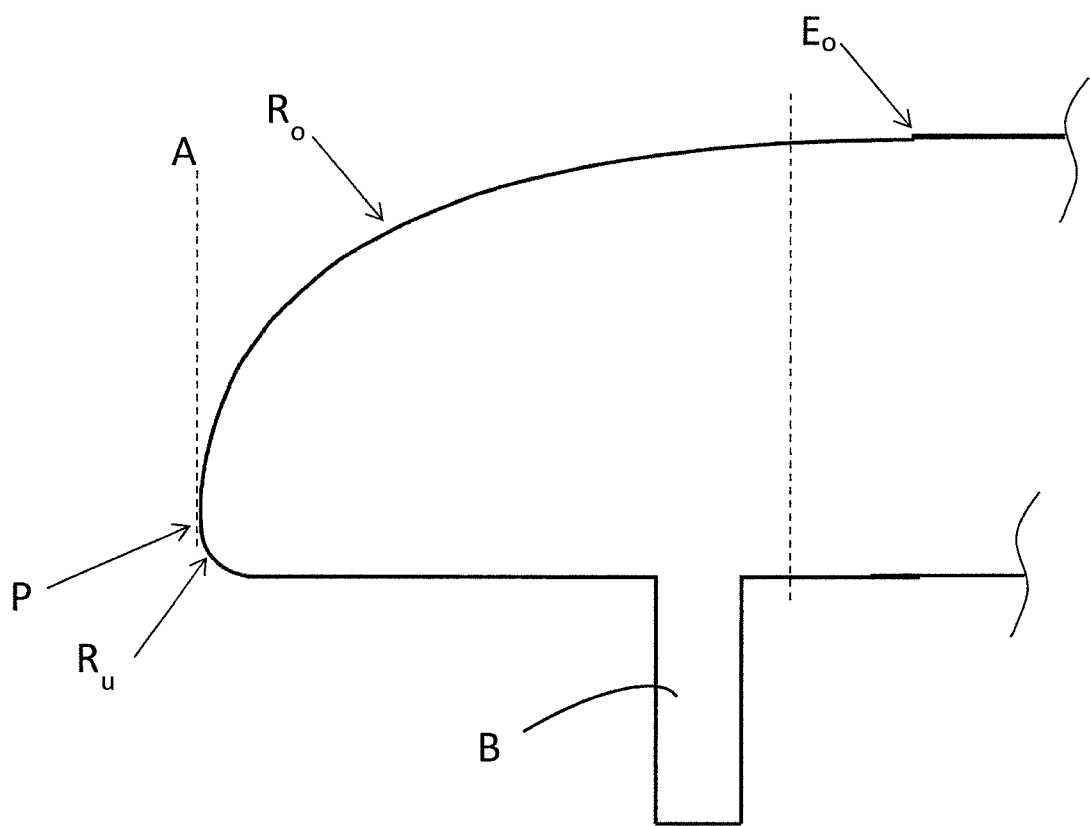

FIG. 1: is a plan view of the front side of a U-shaped bezel, particular attention being drawn to the region of the internal angle between the legs of the bezel;

FIG. 2: is a plan view of the reverse side of the bezel of FIG. 1; the section A'-A' is depicted in FIGS. 3a to 3f for various embodiments;

FIG. 3a: is a cross-sectional view along the line A'-A' in FIG. 2 of the bezel shown in FIG. 2 in a first embodiment;

FIG. 3b: is a cross-sectional view along the line A'-A' in FIG. 2 of the bezel shown in FIG. 2 in a second embodiment;

FIG. 3c: is a cross-sectional view along the line A'-A' in FIG. 2 of the bezel shown in FIG. 2 in a third embodiment;

FIG. 3d: is a cross-sectional view along the line A'-A' in FIG. 2 of the bezel shown in FIG. 2 in a fourth embodiment;

FIG. 3e: is a cross-sectional view along the line A'-A' in FIG. 2 of the bezel shown in FIG. 2 in a fifth embodiment;

FIG. 3f: is a cross-sectional view along the line A'-A' in FIG. 2 of the bezel shown in FIG. 2 in a sixth embodiment;

FIG. 4: is a plan view of the reverse side of the bezel of FIG. 1, particular attention being drawn to the region X which is the location of the internal angle between two legs;

FIG. 5a: is a perspective view of ribs attached in the internal angle region X shown in FIG. 4 in a first embodiment;

FIG. 5b: is a perspective view of ribs attached in the internal angle region X shown in FIG. 4 in a second embodiment;

FIG. 5c: is a perspective view of ribs attached in the internal angle region X shown in FIG. 4 in a third embodiment;

FIG. 6a: is a plan view of the front side of a U-bezel;

FIG. 6b: is a plan view of the front side of an O-bezel;

FIG. 6c: is a plan view of the front side of a double-O-bezel;

FIG. 6d: is a plan view of the front side of a T-bezel;

FIG. 6e: is a plan view of the front side of an I-bezel;

FIG. 7: is a cross-sectional view of the perimeter region of a bezel with rib in the perimeter region.

FIG. 1 shows a U-shaped bezel (abbreviated to: U-bezel) having a first and second exterior leg S1, S2 and a leg S3 connecting the legs S1 and S2, particular attention being drawn to region X of the internal angle R1 between the legs S2 and S3 of the bezel. The internal angle between the legs S3 and S1 is preferably the same as the internal angle between the legs S3 and S2, but it can also differ. The internal angle R1 describes approximately a quadrant. The radius of this quadrant is indicated by "Ri". For easier understanding of the geometric relationships, the drawing moreover includes a coordinate system for orientation. It can be seen that the areas of the front side and of the reverse side of the bezel extend within the x/y-plane, and this also applies accordingly to the rounded transition region between the legs S3 and S1 with the internal angle R1. The feature, essential to the invention, of the edge rounding in z-direction is explained below.

FIG. 2 shows the rear view of the U-bezel of FIG. 1. The adhesive beads H can clearly be seen here. The sectional line A'-A' runs through the rounded internal angle between the legs S1 and S3. The following FIGS. 3a to 3f show cross-sectional views of the bezel along this sectional line in various alternative embodiments. The upper rounded edge $R_o$ and the lower rounded edge $R_u$ can be seen. "P" indicates the outermost endpoint of the bezel at the rounded edge. An imaginary straight line A perpendicular to the front side and the reverse side of the bezel runs through said endpoint P. "$E_o$" indicates the point of transition between the rounded region of the rounded edge and the actual front side of the bezel, i.e. generally a surface without curvature. "b" indicates the distance between the straight line A running through the point P and a perpendicular running through the point $E_0$, where the perpendiculars run orthogonally with respect to the reverse side of the bezel.

In the embodiment shown in FIG. 3a, the upper edge rounding takes the form of a Bézier curve. Between the upper and lower rounded edge, $R_o$ and $R_u$, there is no straight-line transition region present that is perpendicular to the front side and the reverse side. The endpoint P is therefore genuinely a point, whereas in the case of the embodiment shown in FIG. 3d the outermost endpoint P lies on a straight-line transition section on the straight line A perpendicular to the front side and reverse side of the bezel.

In FIG. 3b, the upper edge $R_o$ has been rounded in the shape of a Bézier curve. The lower edge $R_u$ has been non-specifically rounded. The point $E_o$ is the point at which the Bézier curve ends. There is a straight-line transition section present, perpendicular to the front side and the reverse side of the bezel, between the two rounded edges at the sides connecting the front side and the reverse side of the bezel.

In the embodiment in FIG. 3c, the upper edge $R_u$ has been rounded in the shape of a Bézier curve. The lower edge $R_u$ has likewise been rounded in the shape of a Bézier curve, and specifically in the shape of a quadratic Bézier curve. There is no straight-line transition section present, perpendicular to the front side and the reverse side of the bezel, between the two rounded edges at the sides connecting the front side and the reverse side of the bezel.

In the embodiment shown in FIG. 3e, only the upper edge $R_o$ has been rounded, whereas the lower edge $R_u$ is a conventional "angular edge", where an "angular edge" can certainly have minimal rounding caused by a manufacturing process. The upper edge $R_o$ has been rounded with radius varying across the rounding, and specifically in the shape of a Bézier curve. There is a direct transition between the rounding of the upper edge $R_o$ and the lower angular edge $R_u$, and the vertical dimension of the outermost end point P is therefore equal to 0.

In contrast to this, the dimension of the section P in the embodiment shown in FIG. 3f is greater than 0, i.e. a portion of the cross section of the side connecting the front side and the reverse side of the bezel comprises a straight line.

FIG. 4 again shows, as in FIG. 2a, the reverse side of the U-bezel, inclusive of the region indicated by "X" at the point of intersection between two legs. This region "X" is depicted in enlarged form for certain embodiments in FIGS. 5a to 5c, there being ribs here placed perpendicularly onto the area of the reverse side of the bezel. These ribs can, as shown in FIG. 5a, form a rib structure interrupted by cutouts L or, as shown in FIG. 5b, can form a coherent rib line G. Another possibility is a coherent rib line G which has indentations F, as shown in FIG. 5c. It can moreover be seen in FIG. 4 that the adhesive beads are not continuous, but instead have gaps.

Cutouts L between two ribs are usually provided for, by way of example, water management. However, it is preferable in the invention to avoid cutouts between the individual ribs, or else if necessary that these take the form of indentations F. The cutouts imply local differences in stiffness which lead to concentrations of stress and therefore to higher expansion values.

FIGS. 6a to 6e show various preferred bezel shapes, and specifically a U-bezel (FIG. 6a), an O-bezel (FIG. 6b), a double-O-bezel (FIG. 6c), a T-bezel (6d) and an I-bezel (FIG. 6e).

FIG. 7 shows a cross section of the perimeter region of a bezel of the invention where a rib B is present in the perimeter region. The drawing does not include the depression in the front side of the base layer of the bezel, because although this is present its extent is minimal. The upper edge $R_o$ has been rounded in the shape of a Bézier curve. The location of the rib is in front of the point $E_o$, i.e. in front of the point of transition between the rounded region of the rounded edge and the actual front side of the bezel, i.e. a surface without curvature.

Key

R1 internal angle (rounded region between two legs)
X region shown enlarged around the internal angle R1
P outermost endpoint of the bezel in the case of the rounded edge, optionally in the form of straight-line transition section between the upper and lower rounded edge
A straight line through P, perpendicular to the plane of the front side and the reverse side
r radius of an imaginary circle on which the respective point of the rounded edge lies
$E_o$ point of transition between the rounded region of the rounded edge and the actual front side of the bezel, i.e. generally a surface without curvature
b width of the region between A and E
L cutout in a rib structure
G rib
F indentation in a rib
H adhesive bead
S leg
$R_o$ upper rounded edge
$R_u$ lower rounded edge
Ri radius of the rounded region of the internal angle between two legs (x/y-plane)
B rib

What is claimed is:

1. A bezel for motor vehicle glazing systems, comprising a base layer based on a thermoplastic, with a front side, a reverse side, and a side connecting the front side and the reverse side, the side connecting the front side and the reverse side comprising a first edge adjacent to the front side forming an upper edge and a second edge adjacent to the reverse side forming a lower edge wherein in a cross-sectional view of the bezel the first edge is rounded forming an upper rounded edge $R_o$, wherein the rounding has a radius that is variable across the rounding and wherein the bezel has a coating on the front side and in the rounded edge region of the front side.

2. The bezel as claimed in claim 1, wherein, in relation to the reverse side and the front side of the bezel, the bezel is U-shaped, O-shaped, double-O-shaped, T-shaped or I-shaped.

3. The bezel as claimed in claim 1, wherein in cross-sectional view of the bezel the second edge is rounded forming a lower rounded edge $R_u$.

4. The bezel as claimed in claim 3, wherein the bezel has a coating on the reverse side.

5. The bezel as claimed in claim 1, wherein at least the rounding of the first edge has the shape of, or approximately the shape of, a Bézier curve.

6. The bezel as claimed in claim 5, wherein the Bézier curve is quadratic or cubic.

7. The bezel as claimed in claim 1, wherein the bezel is U-shaped, O-shaped, double-O-shaped or T-shaped, and has at least two legs, the term leg meaning a section which adjoins, at an angle, another section in the same plane of the bezel, where at least one internal angle R1 situated between the two legs of the bezel has been rounded, where the internal angle R1 describes a quadrant.

8. The bezel as claimed in claim 7, wherein the radius of the quadrant is at least 10 mm.

9. The bezel as claimed in claim 1, wherein a width b of the region between an outermost point P at the rounded edge of the bezel and a point E at the transition between the rounded region and a surface without curvature is at least 2.5 mm.

10. The bezel as claimed in claim 1, having a wall thickness of from 1.5 mm to 5 mm.

11. The bezel as claimed in claim 1, wherein the base layer comprises polycarbonate, optionally carbon black, and a mold-release agent based on a fatty acid ester, and on at least one side of the base layer, a polysiloxane-based scratch-resistant coating comprising at least one UV absorber.

12. The bezel as claimed in claim 11, wherein carbon black is present comprising nanoscale carbon black with average primary particle size less than 100 nm, determined by scanning electron microscopy.

13. The bezel as claimed in claim 1, wherein the bezel has, on the reverse side, a rib which, in relation to the cross section of the bezel, is in the region of the first edge rounding.

14. A compound-structure system comprising bodywork of a motor vehicle and comprising a bezel as claimed in claim 1.

15. A process for the production of a bezel as claimed in claim 1, comprising the following steps:
  closure of the injection mold,
  injection of a first polymer composition, preferably by way of injection-compression molding or cascade injection molding, then cooling to a maximal component temperature lower than the glass transition temperature of the first polymer composition,
  optionally moving of the cavity into the next position or use of a mold with a larger cavity for purposes of injection of a second polymer composition, in such a way that on closure of the mold in this position an intervening space is produced between the first hardened polymer composition and the mold wall,
  optional injection of the second polymer composition, then cooling to a maximal component temperature lower than the glass transition temperature of the second polymer composition,
  coating of the bezel.

* * * * *